Aug. 4, 1970   J. MULLER   3,522,530
DEVICE FOR DETECTING QUANTITY OF WATER IN A LIQUID FUEL
Filed Feb. 28, 1968   4 Sheets-Sheet 1
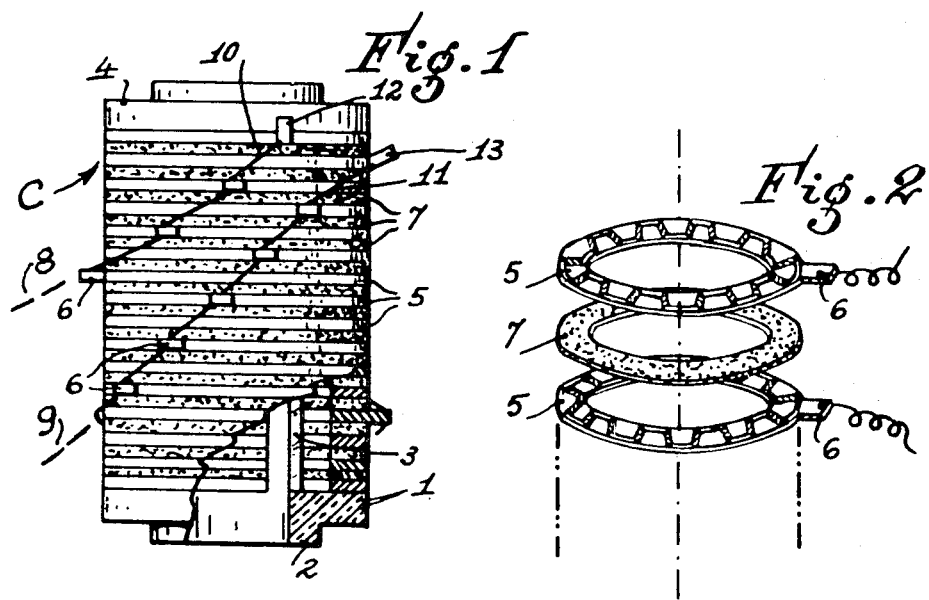
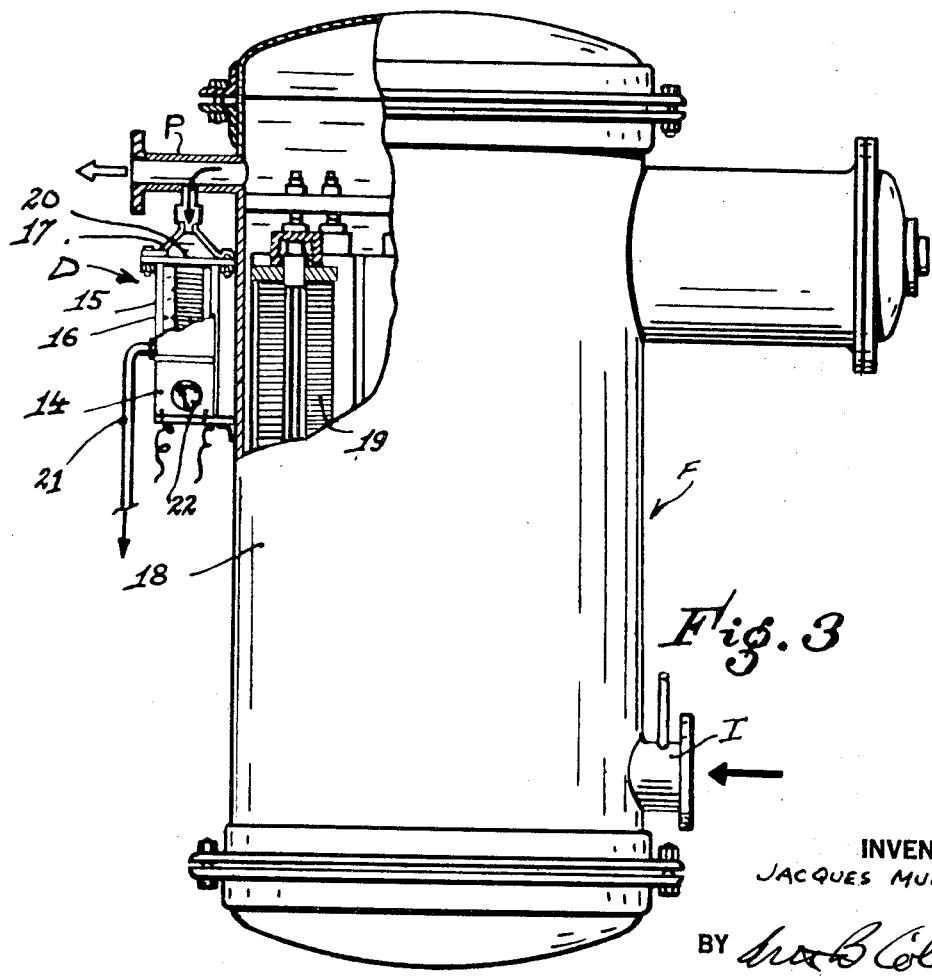
INVENTOR
JACQUES MULLER
BY
ATTORNEY

INVENTOR
JACQUES MULLER

BY
ATTORNEY

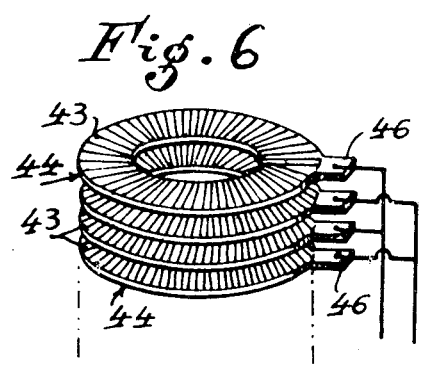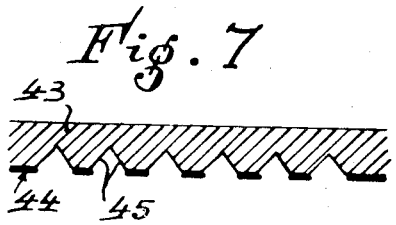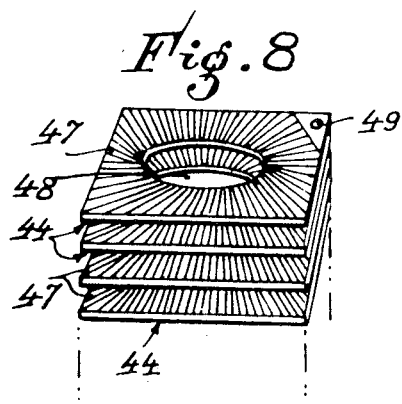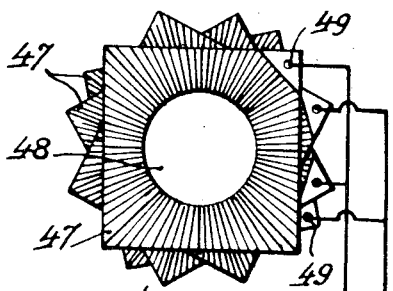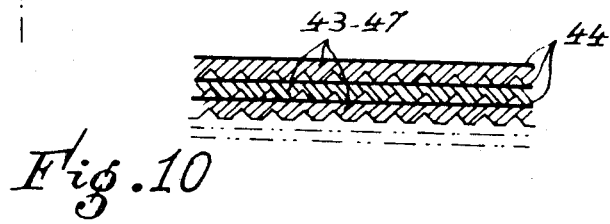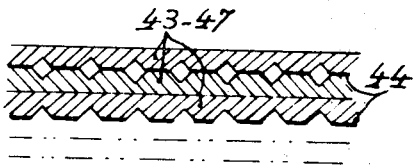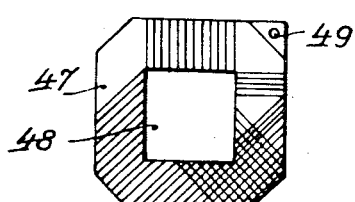

INVENTOR
JACQUES MULLER
BY
ATTORNEY

United States Patent Office 3,522,530
Patented Aug. 4, 1970

3,522,530
DEVICE FOR DETECTING QUANTITY OF
WATER IN A LIQUID FUEL
Jacques Muller, La Garenne-Colombes, France
Filed Feb. 28, 1968, Ser. No. 709,090
Claims priority, application France, Mar. 3, 1967,
97,274
Int. Cl. G01r 27/02; B01d 39/10
U.S. Cl. 324—65                                    8 Claims

ABSTRACT OF THE DISCLOSURE

A device for detecting the amount of water present in a liquid fuel by determining the resistivity and hence the current flowing between conductor plates of a cartridge.

---

As conducive to an understanding of the invention, it is noted that due to condensation resulting from the hydrometric state of the air, or to some other cause, hydrocarbons can contain a certain amount of undissolved water in suspension.

In view of the dangers which this water, even in minimal quantities, such as traces or drops, can provoke in the working of motor propellants, such as gasoline, kerosene and other hydrocarbons, for example, it is highly desirable for reasons of safety to be able to detect the presence of water continuously when filling the tanks of aircraft in order to stop the filling when the percentage of water is too high.

Various methods have already been proposed, and detector devices have been designed, but up to now, these have not given complete satisfaction, either from the standpoint of rapidity of detection, or precision in quantitative measurement, and simplicity.

It is accordingly among the objects of the present invention to provide an electronic water detector, especially designed to be used for any hydrocarbon, which is simple in design and economincal and practical to produce.

According to the invention, the detector comprises a detecting filter cartridge and an electronic amplifier which, based on a measurement of the variable resistivity due to the presence of water (even in traces) in a non-miscible liquid such as a hydrocarbon fuel provides a rapid indication of the presence of water and its percentage, which can be translated by an ohm meter. The amplifier may trigger an alarm signal, visual or sonic, as well as stop a feed pump or close a valve disposed in the filling line to the tanks of aircraft, for example (or to slow down the speed of circulation, in the eliminator, of sediments and water) or switch in another feed source that is held in reserve.

In the accompanying drawings in which are shown various possible embodiments of the several features of the invention, FIG. 1 shows, on an enlarged scale, a side elevational view of a detecting cartridge, partly in cross section;

FIG. 2 represents a set of two filtering washers and a separation disc of absorbent paper;

FIG. 3 is a view of a filter to eliminate sediments from the fuel, provided with an electronic water detector device;

FIG. 6 represents schematically, a set of grooved detecting washers with insulated faces;

FIG. 7 is a view in partial section and on an enlarged scale of a grooved detecting washer with insulated faces;

FIG. 8 shows a set of grooved detecting plates;

FIG. 9 is a plan view of an example of arrangement of the detecting plates;

FIGS. 10 and 11 are views, in section and on an enlarged scale, of examples of assemblies of detecting washers or plates;

FIG. 12 shows another embodiment of a detecting plate;

Figure 4:
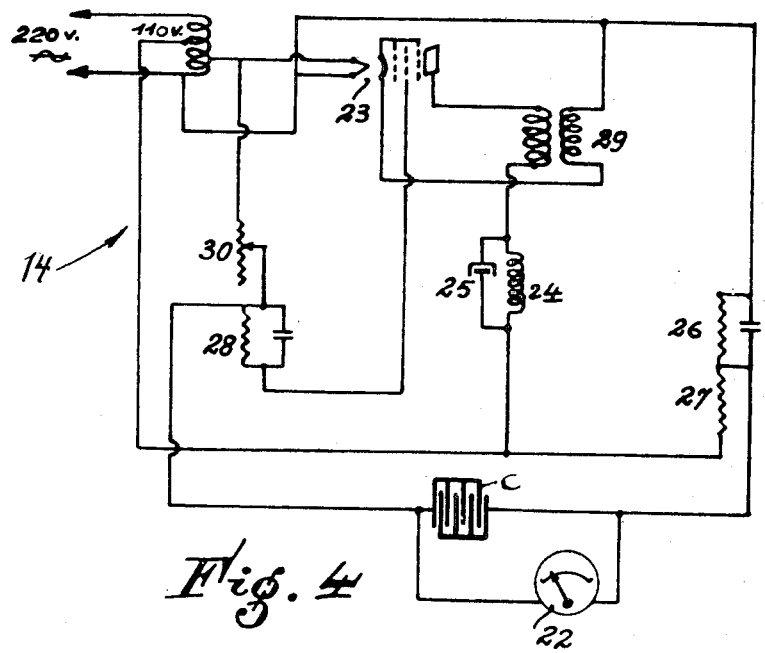
FIG. 4 and FIG. 5 show, schematically, two amplifier devices cooperating with a detecting cartridge.

Referring now to the drawings, as shown in FIG. 1, the water detecting cartridge C comprises a hollow cylindrical plastic body 1, formed with a solid end 2 having circumferentially spaced longitudinal bars 3 rising therefrom and a removable locking piece 4, retained by interlocking or screwing on the free ends of the bars 3.

Stacked on the bars 3 and encompassing the latter is a set of grooved metal filtering washers 5 (FIG. 2), preferably of the type with oblique micro-grooves such as shown and described in Pat. No. 3,214,368. Each washer 5 is provided with an outwardly projecting tab 6, the washers 5 being separated by suitable, absorbent paper washers 7 of the same dimensions.

The set of washers 5 and 7 which form a filter column, are clamped together by the removable locking piece 4, the projecting tabs 6 first being offset so they will be disposed in two substantially spiral lines 8 and 9, one of which is made by the tabs of the washers 5 disposed in the odd order, while the other line is formed by the tabs of the washers 5 disposed in the even order. The tabs 6 of these two lines 8 and 9 are joined together respectively by leads 10 and 11 to form two distinct electric circuits 12 and 13, completely separated by the paper washers 7.

The detecting cartridge C thus formed is designed to be used in conjunction with an electronic amplifier 14 (FIG. 3) to form a water detection device, based on the potential difference resulting from a change in resistivity due to the presence of water, however minimal (trace or drop) in a non-miscible liquid such as a hydrocarbon fuel which, on passing through the cartridge, impregnates one of more washers of paper.

The cartridge C is axially positioned in a container 15, in such a way as to leave a cylindrical space 16 between the cartridge C and the inner surface of the container. The upper part of the detector device D separated from the cylindrical space 16 by a transverse partition 17, communicates with the outlet pipe P of a filter F, of the type shown in Pat. No. 3,214,368 which has filter columns 19, for non-miscible fluids, while the lower portion of the filter has an inlet pipe 20 for the fuel to be purified.

As the construction and operation of the filter F is fully shown and described in said Pat. No. 3,214,368 and per se forms no part of this invention, it will not be further described.

The upper part of the detecting device D communicates with the inside of the cartridge C defined by the aligned openings in the washers 5, 7, through an orifice 20 in the transverse partition 17. The lower part of the container 15 has an outlet port 21 so that the fluid entering the detector D from pipe P will emerge from the detector D only after passing through the filtering washers 5 into the cylindrical space 16, to flow through duct 21 toward the inlet pipe I to the filter F.

Thus, the paper washers 7 will absorb the liquid fuel and depending upon the amount of water present in adjacent washers 5 will cause a corresponding resistance to exist between adjacent washers 5. The current thus flowing through the leads 10, 11 will be related to the quantity of water present in the fuel and this current may be amplified by any suitable amplifier to operate an alarm, a valve or a meter to indicate the quantity of water present.

Although any conventional amplifier may be employed, in the embodiment shown in FIG. 4, the amplifier uses a pentode tube 23 electrically connected to a relay 24 disposed in parallel with a capacitor 25. Resistances 26, 27 and 28, a self-induction 29 and a means of adjustment by variable resistor 30, complete this device, which is supplied with electric current by any suitable source An ohm meter 22 or other indicating means is mounted in parallel with the detecting cartridge C.

Figure 5:
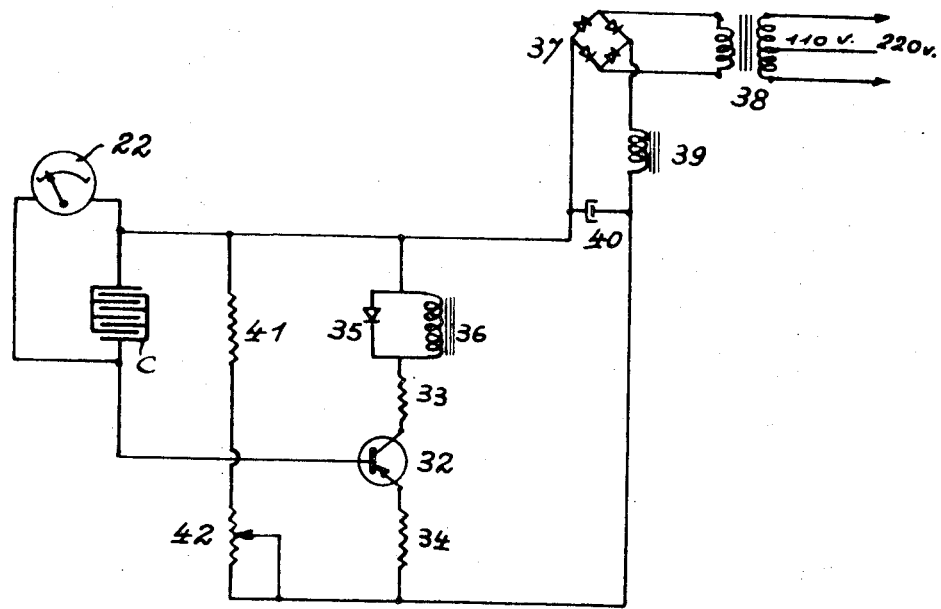

In the embodiment of FIG. 5, the amplifier uses a transistor 32 connected to suitable resistances 33 and 34, the latter being connected to a diode 35 mounted in parallel with a relay 36. A rectifier 37 following a transformer 38 for the line current, provides, in combination with filtering inductance 39 and capacitor 40, the current necessary for measuring the resistivity of the paper washers of the cartridge C which will be easily read by an ohm meter 22 mounted in parallel with the said cartridge. A resistance 41, cooperating with a potentiometer 42, permits adjustment of the sensivity of the detection.

In the embodiment of the cartridge C shown in FIGS. 6 to 12, the grooved washers are provided on one or both faces with an insulating material such as an epoxy or the like, in place of the absorbent paper washers.

This arrangement is designed to insure rapid passage of the traces or droplets of water and consequently the rapid return of the device to idle condition ready for another signalling operation.

Referring to FIGS. 6 to 12 of the drawings, the metal washers 43, which form the water detecting cartridge C, are grooved on one or both faces and are also provided on one or both faces with a layer of insulating material 44 (FIG. 7) with the exception of the walls 45 of the grooves in order to leave the latter bare. As in the embodiment of FIG. 2, the insulated metal washers 43 have a tab 46 designed to be electrically connected to the leads 10 or 11 of one of the circuits 12, 13.

To elongate the grooves, without substantially increasing the surface of the detecting elements, the washers can advantageously be replaced by grooved plates 47 (FIG. 8) of square or other shape, having a central hole 48, of any shape. A hole 49, made in one corner of these plates, facilitates, when they are offset with respect to one another, as shown in FIG. 9, ready connection thereto of the leads 10 or 11.

The detecting elements (washers or plates) are stacked on one another directly, with no intermediate paper washer as in the embodiment of FIG. 1, the grooves being applied on a plane face of the following element (FIG. 10) or on a grooved face of the latter (FIG. 11). All the elements are insulated from each other by one or two layers of insulating material 44, the flow of the traces or droplets of water placing two detector elements (washers 43 or plates 47) in communication, current flow between the detector element being determined by the quantity of water in the fuel. Due to this arrangement, after the passage of the traces or droplets of water, the signal device immediately returns to its starting or idle position.

It is understood that not only can the form of the detecting elements be modified as, for example, by cutting the corners of the plates (FIG. 12), but the grooves can be given different orientations to direct the passage of the fluid or change the speed of this passage.

Figure 13:
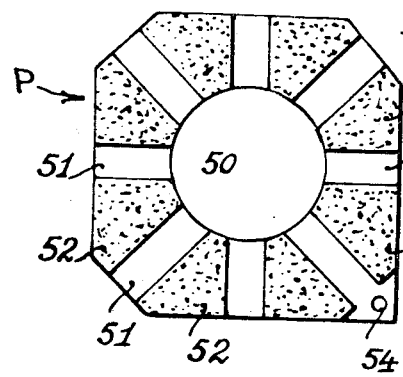
FIG. 13 is a plan view of a plate provided with flat and bare zones separated by insulating zones.
Figure 14:
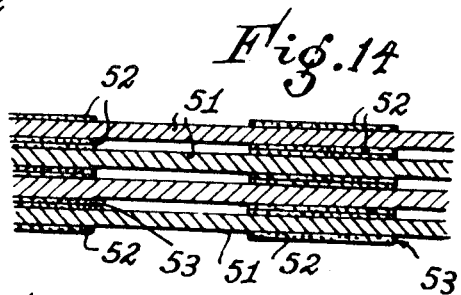
FIG. 14 is a partial enlarged section of superposed plates of this kind.

In the embodiment shown by FIG. 13, the metal plate or washer P, which has a central hole 50, has bare, flat radiating zones 51, separated by insulated zones 52, obtained by the application of a layer of an insulating material which provides a slight superthickness 53 (FIG. 14) in order to insulate the bare zones 51 of the stacked plates or washers, the zones of the same type being disposed alternately face to face.

As in the preceding embodiments, the plates P are provided with a tab 54 designed for the attachment of one of the wires to form the two electric circuits connected to the signal devices (visual, sonic or recording) through suitable conventional amplifier.

Figure 15:
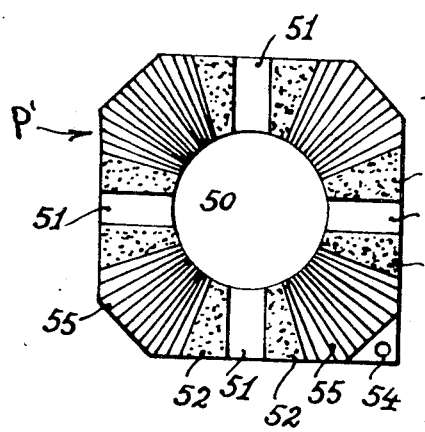
FIG. 15 shows a plan view of a plate provided with a succession of flat and bare zones, insulated zones and grooved zones.
Figure 16:
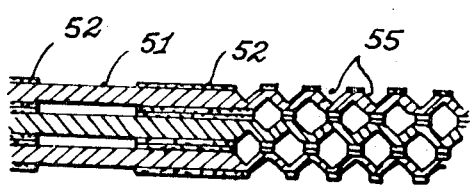
FIG. 16 is a partially enlarged section of several superposed plates of the latter embodiment.

In another embodiment, the plate or the washer P' is provided with bare flat zones 51 (FIG. 15) separated, regularly or not, by grooved zones 55, the faces of contact being insulated as at 52 as previously described, and the stacking of the plates or washers being achieved in such a way that the flat zones 51 and grooved zones 55 are respectively face to face with zones of the same type (FIG. 16).

Figure 17:
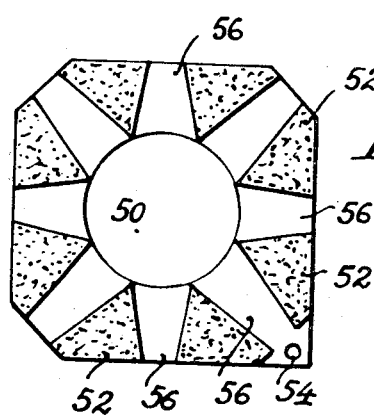
FIG. 17 represents a plate provided with flat and bare zones of decreasing width.

It is evident that the form and the arrangement of the zones can be modified without thereby departing from the spirit of the invention. Thus, for example, zones of decreasing width 56 (FIG. 17) can be employed to obtain slots of decreasing width, in order to brake, to different degrees, the passage of the laminated drops of water or mist, or provoke the assembly of fine particles of water in order to facilitate detection. Slots of increasing width can be formed to facilitate, instead of braking, the said passage.

By reason of the provision of the flat, radiating zone of bare metal, separated by insulated zones forming a slight superthickness, as shown in FIGS. 13 to 17 when the washers or plates are applied on one another, with zones of the same type placed face to face, small slots or level areas will be formed that will laminate the relatively thick drops of water or the mist to increase the sensitivity of the device.

Having thus described my invention, what I claim as new and desire to secure by Letters Patent of the United States is:

1. A device for detecting the quantity of water present in a liquid fuel, comprising a container having an inlet, a cartridge in said container comprising a stack of juxtaposed metal plates, each of said plates having a central opening, said openings forming a central bore in said cartridge, the outer periphery of the cartridge defined by said juxtaposed plates being spaced from the inner surface of said container to define a discharge chamber, said container having an outlet port in communication with said discharge chamber, one end of said bore being closed and the other end of said bore being in communication with said inlet, each of said plates having grooves in at least one surface thereof extending from said bore to said discharge chamber whereby liquid fuel entering the inlet of said container will flow into said bore and pass through the grooves in said plates into said discharge chamber and then flow from said outlet, the surface of the plates having the grooves therein having an insulating coating thereon covering the entire surface of said plate except for the walls of said grooves, said insulating material engaging the surface of the next adjacent plate to insulate one from the other, means to apply a source of potential across at least a pair of adjacent plates, whereby the resistivity of the liquid passing through the grooves will act as a resistor, the value of which will be dependent upon the quantity of water in the liquid fuel so that the current flow between adjacent plates will be dependent upon the quantity of water present in the liquid fuel.

2. The combination set forth in claim 1 in which means are provided to measure the current flow through the liquid flowing between adjacent plates.

3. The combination set forth in claim 1 in which pairs of plates in said cartridge are juxtaposed and positioned so that the juxtaposed plates are in engagement and insulated from each other, and the grooves therein are aligned to provide passageways for flow of liquid therethrough.

4. The combination set forth in claim 1 in which the cartridge comprises a base of insulating material having a plurality of circumferentially spaced rods rising therefrom, said rods extend through the central opening of said plates and a cover member secured to the upper ends of said rods to clamp said plates together, said base closing the lower end of said bore in the stack of plates and said cover member having an opening leading into the upper end of said bore.

5. The combination set forth in claim 1 in which said cartridge comprises a circular base member having a supporting structure rising therefrom and extending through the central opening of said metal plates, a cover member is secured to the upper end of said supporting structure to clamp said plates against said circular base member, said base member closing one end of said bore, said cover member having an aperture leading into the other end of said bore, said supporting structure having apertures therethrough to permit flow of fluid from said bore through the grooves of said plate into said discharge chamber.

6. The combination set forth in claim 1 in which the grooves in said plates are defined by bare relatively flat elongated spaced zones extending from the central opening in each plate to the periphery thereof, the regions of said plate between said zones being coated with insulating material.

7. The combination set forth in claim 6 in which the width of said zones varies from one end to the other end.

8. The combination set forth in claim 6 in which the surface of said plates having the flat elongated spaced zones has a plurality of sets of micro-grooves therein between said zones and extending from the central opening in said plate to the periphery thereof.

References Cited

UNITED STATES PATENTS

| 2,793,527 | 5/1957 | Turner et al. | 73—73 |
| 2,807,956 | 10/1957 | Doble. | |
| 3,214,368 | 10/1965 | Muller | 210—23 |
| 3,397,794 | 8/1968 | Toth et al. | 210—498 X |

EDWARD E. KUBASIEWICZ, Primary Examiner

U.S. Cl. X.R.

210—498; 324—30